United States Patent [19]

Ban et al.

[11] 4,266,596
[45] May 12, 1981

[54] METHOD OF PRODUCING A UNIDIRECTIONAL FIBER-REINFORCED COMPOSITE MATERIAL

[75] Inventors: Keisuke Ban, Fujimi; Takeo Arai, Higashimatsuyama, both of Japan

[73] Assignee: Honda Giken Kogyo Kabushiki Kaisha, Tokyo, Japan

[21] Appl. No.: 961,385

[22] Filed: Nov. 14, 1978

[30] Foreign Application Priority Data

Nov. 29, 1977 [JP] Japan .................................. 52/143029

[51] Int. Cl.³ ........................ B22D 18/02; B22D 19/14
[52] U.S. Cl. ....................................... 164/97; 164/108
[58] Field of Search ............................ 164/91, 97, 108

[56] References Cited

U.S. PATENT DOCUMENTS 1,072,026  9/1913  Morris ..................................... 164/97
3,970,136  7/1976  Cannell et al. ........................ 164/108

FOREIGN PATENT DOCUMENTS 1289823  9/1972  United Kingdom ..................... 164/108

*Primary Examiner*—Robert D. Baldwin
*Attorney, Agent, or Firm*—Haseltine and Lake

[57] ABSTRACT

A method of producing a unidirectional fiber-reinforced composite material by covering bundles of an inorganic fiber having unidirectionally high elasticity and high strength with a wire-like, foil-like or knit-like material which is the same as, or different from, a matrix metal and is capable of being molten and diffused into said matrix metal, to thereby form a fiber body having an optional shape, volume and fiber density; placing the resulting fiber body in an appropriate location within a mold; pouring a molten matrix metal into said mold; and squeeze casting said molten matrix metal along with the fiber body to form the unidirectionally fiber-reinforced composite material while causing said covering material to melt and diffuse under heat of said molten matrix metal into the latter.

7 Claims, 8 Drawing Figures

FIG. 2
FIG. 1
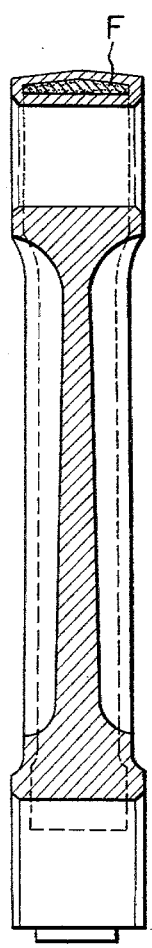
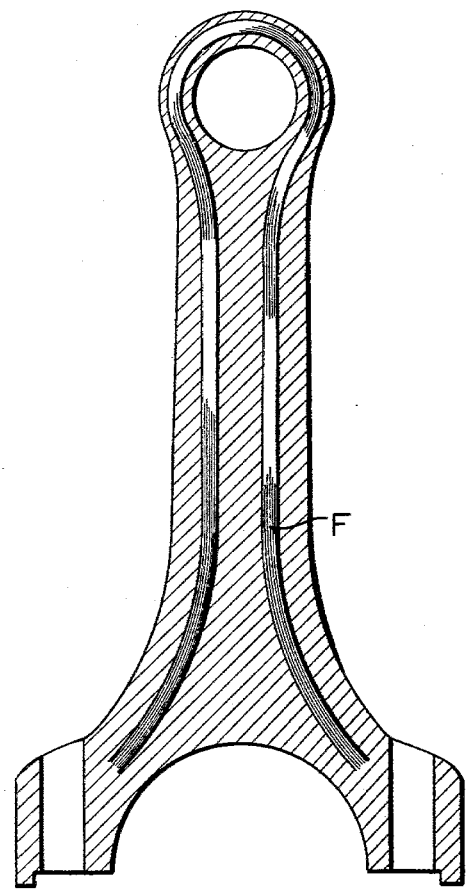
FIG. 3
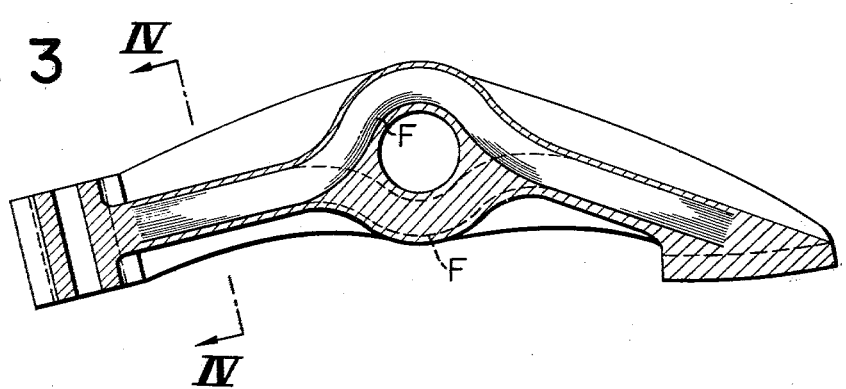
FIG. 4
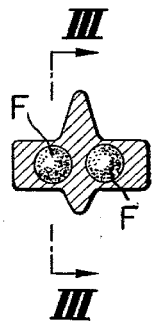

METHOD OF PRODUCING A UNIDIRECTIONAL FIBER-REINFORCED COMPOSITE MATERIAL

BACKGROUND OF THE INVENTION

The present invention relates to a method of producing a fiber-reinforced composite material and specifically to a method of producing a unidirectional fiber-reinforced composite material.

In comparison with a non-directionally fiber-reinforced composite material, a unidirectionally fiber-reinforced composite material has by far excellent reinforcing effect and various attempts have therefore been made conventionally to improve its physical properties and its producibility. However, handling and arrangement of the fiber has been difficult. In order to improve this problem, there has so far been made a variety of proposals. For example, a method of directly arranging the fiber in a mold; a method of prearranging the fiber bundles by use of jigs, etc., placing the fiber bundles into a mold as they are and rendering them composite; a method of laminating or metallizing or vaporizing the fiber into a foil-like matrix in advance; a method of handling the fiber as a prepleg by means of organic or inorganic binders; a method that uses filament winding; and so forth. Most of them however are yet at the stage of research and fail to provide a really satisfactory solution.

The inventors of the present invention proposed previously a method of fiber-reinforcing a metallic member to be reinforced by forming, from an inorganic fiber, a fiber shaped body having an optional shape and bulk density and squeeze casting the shaped body into desired positions of the metallic member, and also various application techniques of said method. Unlike the conventional methods this method enables one to fill and combine the fiber body in and with the metallic member simultaneously with shaping of the metallic member itself. In other words, in accordance with this method the fiber shaped body is filled in and combined with a molten metal in an extremely efficient manner under a hydrostatically high pressure and thereafter cooled rapidly to solidify to thereby prevent damages of the fiber. At the same time the matrix can be reinforced markedly by squeeze solidification. Thus, the method made a great contribution to the practical use of the fiber-reinforced member by enabling the effective reinforcement of the member to be reinforced in consideration of its shape and function and the efficient utilization of the fiber.

The present invention further improves the above-mentioned production method of a fiber-reinforced composite material and is directed to provide a production method of a unidirectionally fiber-reinforced composite material which insures extremely easy and simple handling and shaping of the fiber body and which has a high production efficiency.

During the production process of the above-mentioned fiber-reinforced composite material, the inventors of the present invention examined a method of unidirectionally fiber-reinforcing a member to be reinforced and a method of arranging the fiber in view of the shape, function and stress-sharing of the member to be reinforced. Results of the examination will be explained with reference to the example wherein a connecting rod of an internal combustion engine (shown in FIGS. 1 and 2) is fiber-reinforced in a specific direction.

An aluminum alloy is used as the matrix metal and a stainless fiber of a $25\mu$ diameter is shaped into the following three kinds of fiber bodies as the reinforcing fiber. As a result of the stress analysis of the connecting rod, it is found that the stress sharing is great at both end portions of the rod section, at the rib and the annular section at the small end. Hence, these portions are preferentially reinforced.

The specification of the reinforcing fibers are as follows.

FIBER BODY (1)

A fiber body of a size of $4\times20\times270$ mm and a mass of 35 g obtained by a shaping of a cloth consisting of stainless spinning yarns of a $12\mu$ diameter, a size of $21\times21$ mm and a weight of 500 g/m$^2$.

FIBER BODY (2)

A fiber body of a weight of 35 g obtained by covering and securing a unidirectional stainless fiber bundle of a diameter of $25\mu$ and a length of 270 mm with a knit-like cloth of $2.1\times2.1$ mm and a weight of 500 g/m$^2$ into a sectional shape of $4\times20$ mm.

FIBER BODY (3)

A rod-like fiber body of a diameter of 8 mm and a weight of 35 g formed by winding and securing helically a unidirectional fiber bundle of a diameter of $25\mu$ and a length of 270 mm with stainless spun yarns of a diameter of $12\mu$.

Each of the fiber bodies having the above-mentioned specification is disposed continuously at portions of a casting mold for the connecting rod corresponding to the rod section, both side ribs and the small end annular section and the connection rod is produced using an aluminum alloy (JIS Symbol AC8B material) as the matrix in accordance with a squeeze casting method. Condition of filling of fiber, the analysis of the composite state and strength test of each of the resulting connecting rods are made with the results as follows.

(1) In the fiber body (1), the invasion resistance to the molten metal is great because the fiber is of a cloth knitting type and the fiber itself has a great fiber density and because the expanding effect is restrained between the fibers at the time of invasion of the molten metal. Breakages also tend to occur on the weft fibers with respect to the warp fibers in the reinforcing direction for the same reasons. In this case, no remarkable improvement is observed even when the pitch and the number of constituent yarns of the weft are decreased.

(2) In the case of the fiber body (2), since covering is made by a cloth, the restraining force of the internal fiber bundle is small and there are a great number of gaps between the fibers. Hence, the invasion resistance to the molten metal is small and consequently the molten metal can be easily impregnated and made composite to the fibers. As the fiber bundle can be covered with cloth and retained accurately at desired positions, the shape-retaining property of the fiber body is extremely good. Though the reinforcing effect is great by the internal unidirectional fibers, the transverse fibers of the cloth reduce the reinforcing effect.

(3) In the case of the fiber body (3), the freedom of the fiber density becomes less in accordance with the fiber diameter in view of the structural factors after impregnation and composite-making are effected. Since the gaps between the fibers become smaller and the expanding effect of the fibers at the time of invasion of the molten metal also becomes smaller consequently, restrictions unavoidably occur to the conditions for impregnation and making composite. However, in comparison with the fiber bodies (1) and (2), degradation in strength does not occur in the constituent fibers and the reinforcing effect is extremely good.

From these results the following conditions are required as the specification for the fiber which enables to employ the aforementioned various production methods of the fiber-reinforced composite materials without spoiling their various advantages.

(a) The fiber body, can be shaped with accuracy into a desired shape, can easily retain its shape and can be easily placed at desired positions in a mold.

(b) The fibers have sufficient gaps between them at the time of filling and making composite the molten matrix metal thereinto and provides the sufficient fiber expanding effect at the time of invasion of the molten metal.

(c) It does not invite the degradation of strength of the constituent fibers and provides a high fiber-reinforcing effect.

(d) The fiber body can be easily handled and produced.

SUMMARY OF THE INVENTION

The main object of the present invention is to overcome the defects of the prior art.

Another object of the present invention is to produce a unidirectional fiber-reinforced composite material which is formed of a fiber body and matrix metal providing favorable mechanical and physical properties.

The principle features of the present invention are directed to a method of producing a unidirectional fiber-reinforced composite material characterized by the steps of: covering bundles of an inorganic fiber having unidirectionally high elasticity and high strength with a wire-like, foil-like or knit-like material which is the same as, or different from, a matrix metal and is capable of being molten and diffused into said matrix metal, to thereby form a fiber body having an optional shape, volume and fiber density; placing the resulting fiber body within a mold; pouring a molten matrix metal into said mold; and squeeze casting said molten matrix metal along with the fiber body to form the unidirectionally fiber-reinforced composite material while causing said covering material to melt and diffuse under heat of said molten matrix metal into the latter.

Another feature of the invention is a method of producing a unidirectional fiber-reinforced composite material characterized by the steps of: forming a knit-like cloth from a longitudinal inorganic fiber having high elasticity and high strength and a transverse fiber which is the same as, or different from, a matrix metal and is capable of being molten and diffused into said matrix metal, and forming further a fiber body having an optional bulk density and shape from the resulting knit-like cloth; placing the resulting fiber body within a mold; pouring a molten matrix metal into said mold; and squeeze casting said molten matrix metal along with the fiber body to form the unidirectionally fiber-reinforced composite material while causing said covering material to melt and diffuse under heat of said molten matrix metal into the latter.

Other features and advantages will best be understood with respect to the accompanying specification, claims and drawings.

BRIEF EXPLANATION OF THE DRAWINGS

The accompanying drawings illustrate the embodiments of the present invention wherein:

FIG. 1 is a longitudinally sectional front view of the connecting rod for an internal combustion engine produced in accordance with the method of the present invention;

FIG. 2 is a longitudinal side view of FIG. 1;

FIG. 3 is a sectional view taken along line III—III of FIG. 4 and shows the locker arm for an internal combustion engine produced in accordance with the method of the present invention;

FIG. 4 is a sectional view taken along line IV—IV of FIG. 3;

DESCRIPTION OF THE INVENTION

Figure 5B:
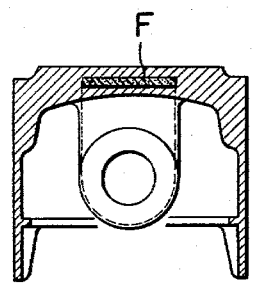
FIGS. 5a and 5b are a longitudinal sectional view and its sectional view taken along line A—A of FIG. 5a of the piston for an internal combustion engine, showing the condition of arrangement of the reinforcing cloth.

On the basis of the foregoing results the inventors of the present invention have furthered the investigation and now found that the foregoing conditions (a) through (d) can be satisfied by forming the transverse fiber of a cloth, of which strength tends to be lower, from a metal fiber which is the same as the matrix metal or different from it but capable of being molten and diffused into the matrix metal for the fibers (1) and (2), and in covering and securing the unidirectional fiber bundle with the spun yarns either helically or in the clip-like form, by forming the spun yarns from a metal fiber which is the same as the matrix metal or different from it but capable of being molten and diffused into the same, into a wire-like or foil-like or knit-like form, for the fiber (3).

Even if the gaps between the fibers and the fiber density are not proper, it is possible to perfectly make composite the fiber body to the matrix metal by the steps of selecting such a fiber body that has excellent handling property and shape-retaining property and that can be easily placed in the mold, placing the fiber body in the mold, pressing then the matrix metal, and melting and diffusing into the matrix metal the transverse fiber or covering fiber which is the same as, or different from the matrix metal but is able to be molten and diffused into it, thereby facilitating the expansion of the fiber at the time of squeeze casting. Deviation of the position due to pressurizing or drastic expansion of the fiber bundle does not occur even when the retaining force of the outer cladding to the unidirectional fiber bundle at the time of pouring the molten metal, because the invasion of the molten metal into the fibers takes place after the molten metal is fully poured into the cavity of the mold at the time of pouring or pressing, thereby causing the fiber bundle itself to float in the molten metal. For this reason, it becomes extremely easy to handle and place the reinforcing fibers into the mold and the operation efficiency can therefore be improved to a marked extent. At the same time it becomes possible to reinforce desired positions of the metal member to be reinforced by the use of the unidirectional fiber without causing the deterioration of strength of the constituent fibers.

In accordance with the present invention, it is also possible to fill and combine even the fiber body (3) of the aforementioned specification that has conventionally been believed difficult to do so because of its small fiber gap and mutual fiber contact, and the desired positions can be highly reinforced using the high density fiber. Thus, the present invention provides an extremely high practical value.

Next, examples of the present invention will be explained in the following paragraphs.

EXAMPLE I

Casting of a connecting rod for an internal combustion engine

A unidirectional stainless fiber of a diameter of $24\mu$ is covered and secured helically or in the clip-form by an aluminum wire of a diameter of 0.1 mm to form a fiber bundle F having a diameter of 8 mm, a length of 300 mm, a total weight of 35 g and a bulk density of 2.5 g/cc. The fiber bundle F thus obtained is placed continuously at the rod section, and the small end and large end annular sections of a mold for casting a connecting rod. An aluminum alloy (JIS Symbol AC8B) is molten at a temperature of 800° C. and poured into the cavity of the mold to thereby melt and diffuse the aluminum wire covering the fiber bundle F. The connecting rod for the internal combustion engine as shown in FIGS. 1 and 2 is produced by applying then a hydrostatic pressure of 1500 kg/cm$^2$. As a result of the examination of the connecting rod, it has been confirmed that the rod section and the small end annular section are continuously made composite and reinforced by the unidirectional fiber and that no deterioration of strength occurs in any directions.

EXAMPLE II

Production of a locker arm for an internal combustion engine

A unidirectional stainless fiber of a diameter of $25\mu$ is shaped into a fiber bundle F having a diameter of 4 mm and a bulk density of about 2.0 g/cc in the same way as in Example I. The fiber bundle F thus obtained is continuously placed at both sides of the arm section and the boss section of a mold for casting a locker arm. A locker arm for the internal combustion engine as shown in FIGS. 3 and 4 is produced using an aluminum alloy (JIS Symbol AC8B) as the matrix in accordance with a high pressure squeeze casting method. As a result of the analysis of the product, it has been confirmed in the same way as in Example I that the boss section and the arm section are continuously and effectively made composite and reinforced by the unidirectional stainless fiber.

EXAMPLE III

Figure 5A:
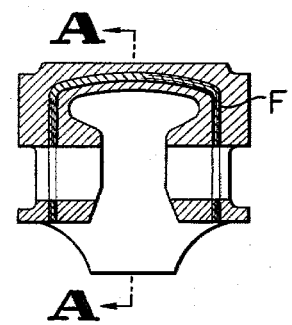

Reinforcement of the pin boss section and the head section of a piston for an internal combustion engine A cloth F of a 34/10 mesh is prepared using a stainless fiber spun yarn (6.3 double yarn) of a diameter of $12\mu$ as the warp and an aluminum wire of a diameter of 0.1 mm as the weft. After the cloth is cut into an optional shape, it is continuously placed at position of a mold for casting a piston corresponding to the walls of both side pin bosses and the head section with the warps arranged in the reinforcing direction. After a molten metal of magnesium alloy (JIS Symbol AZ63) is poured into the cavity of the mold, the cloth F is filled and combined with to the magnesium alloy simultaneously with the shaping of the piston by applying a hydrostatic pressure as high as of 2000 kg/cm$^2$, thereby producing the piston for a 4-cycle engine as shown in FIGS. 5a and 5b. As a result of the analysis of the resulting piston, it has been confirmed that the wefts consisting of the aluminum wire are perfectly molten and diffused into the magnesium alloy at the time of pouring or press-invasion of the molten metal of the magnesium alloy, that the pin boss wall and the head section are unidirectionally fiber-reinforced by the stainless fiber as the warps as shown in FIGS. 5a and 5b, and that rigidity of the pin boss annular section and the pin boss rib, etc. to stress is remarkably improved.

EXAMPLE IV

Figure 6:
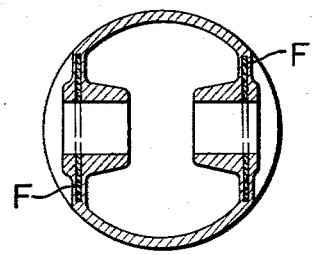

Reinforcement of the pin boss section and the skirt section of a piston for an internal combustion engine The cloth F produced in the above-mentioned Example III is continuously placed at positions of a mold for casting a piston corresponding to both side walls of the pin boss and the skirt section. A molten aluminum alloy (JIS Symbol AC8A) is poured into the cavity of the mold to thereby produce a slipper type aluminum alloy piston for a 4-cycle engine as shown in its cross-section in FIG. 6. As a result of the analysis, it has been found that rigidity of both side walls of the pin boss and the skirt section are improved remarkably by the stainless fiber and their thermal expansion is controlled.

EXAMPLE V

Figure 7:
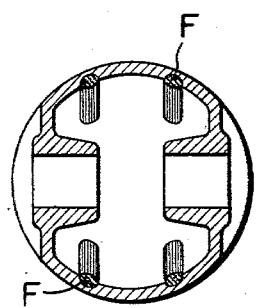
FIGS. 6 and 7 are transversely sectional bottom views of the slipper type piston for an internal combustion, showing the reinforcing cloth and the rod-like fiber body.

Reinforcement of both side skirt rib sections and the head section of a piston for an internal combustion engine A stainless fiber of a diameter of $25\mu$ is arranged unidirectionally and covered helically with an aluminum wire of a diameter of 0.08 mm to form a rod-like fiber body F having a diameter of 4 mm and a bulk density of 2.5 g/cc. The fiber body F thus obtained is placed inside a mold for casting a piston so as to integrally reinforce both side skirt rib sections and the head section. A molten aluminum alloy (JIS Symbol AC8A) is poured into the cavity of the mold to thereby produce a slipper type piston for a 4-cycle engine having the cross-section as shown in FIG. 7. This enables to improve the bending rigidity and the creep characteristics of the skirt section without being dependent on the rigidity of both walls of the pin boss.

As mentioned above, the present invention forms a fiber body having an optional shape, volume and fiber density by covering a unidirectional inorganic fiber bundle for reinforcing desired positions of a metallic member with a wire-like, foil-like or knit-like material which is the same as the matrix metal or different from the matrix metal but capable of being molten and diffused into it. Alternatively, the present invention forms a knit-like cloth from an inorganic longitudinal fiber and a transverse fiber which is the same as the matrix metal or different from the matrix metal but capable of being molten and diffused into it, and further forms the knit-like cloth into a fiber body having an optional bulk density and shape.

Accordingly, production procedures such as handling of the unidirectional reinforcing fiber, its shaping into an optional shape, maintenance of the shape, placing of the fiber body into a casting mold and the like become extremely easy and simple, thereby improving remarkably the work efficiency and reducing drastically the cost of production. Even if the fiber density of the fiber body is increased in order to enhance the strength, it is possible to perfectly and integrally fill and combine the matrix metal to the unidirectional fiber bundle or the reinforcing longitudinal fiber in the knit-like cloth form because during the pouring of the molten matrix metal, the unidirectional fiber bundle or the transverse fiber in the knit-like cloth form facilitates expansion of the fibers under pressure and filling. Thus, there can be obtained a unidirectional fiber-reinforced composite material having extremely high strength and extremely excellent quality.

It will be appreciated that various changes and modifications may be made in the foregoing apparatus without departing from the spirit of the present invention and as many changes may be made in the embodiments herein set forth it being understood that all matter described herein are to be interpreted as illustrative and not in a limiting sense.

What is claimed is:

1. A method of producing a unidirectional fiber-reinforced composite material including the steps of: covering bundles of an inorganic fiber having unidirectionally high elasticity and high strength, with a covering material which is capable of being molten and diffused into a matrix metal, to thereby form a fiber body having a defined shape, volume and fiber density; placing the resulting fiber body within a mold; pouring a molten matrix metal into said mold; and squeeze casting said molten matrix metal along with the fiber body to form the unidirectionally fiber-reinforced composite material while causing said covering material to melt and diffuse under heat of said molten matrix metal into the latter.

2. A method according to claim 1, wherein: said covering material is a wire-like material.

3. A method according to claim 1 wherein: said covering material is a foil-like material.

4. A method according to claim 1, wherein: said covering material is a knit-like material.

5. A method according to claim 1, wherein: said covering material is different from said matrix material.

6. A method of producing unidirectional fiber-reinforced composite material including the steps of: forming a knit-like cloth from a longitudinal inorganic fiber having high elasticity and high strength plus a transverse fiber which is capable of being molten and diffused into said matrix metal; forming a fiber body having a defined shape and bulk density from said knit-like cloth; placing the resulting fiber body within a mold; pouring a molten matrix metal into said mold; and squeeze casting said molten matrix metal along with the fiber body to form the unidirectionally fiber-reinforced composite material while causing said transverse fiber to melt and diffuse under heat of said molten matrix metal into the latter.

7. A method for producing a unidirectional fiber-reinforced composite material as claimed in claim 6, wherein: said transverse fiber is of a material different than said matrix material.

* * * * *